(12) United States Patent
Amirnasr

(10) Patent No.: US 10,811,706 B2
(45) Date of Patent: Oct. 20, 2020

(54) MULTI-COMPONENT MEDIA FOR USE IN A HUMIDIFIER

(71) Applicant: Mann+Hummel GMBH, Ludwigsburg (DE)

(72) Inventor: Elham Amirnasr, Cary, NC (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 15/272,611

(22) Filed: Sep. 22, 2016

(65) Prior Publication Data
US 2017/0084936 A1    Mar. 23, 2017

Related U.S. Application Data

(60) Provisional application No. 62/221,773, filed on Sep. 22, 2015.

(51) Int. Cl.
| | | |
|---|---|---|
| *B23B 5/00* | (2006.01) | |
| *B01F 3/04* | (2006.01) | |
| *H01M 8/04119* | (2016.01) | |
| *B32B 5/06* | (2006.01) | |
| *B32B 5/08* | (2006.01) | |
| *B32B 5/24* | (2006.01) | |

(52) U.S. Cl.
CPC ........... *H01M 8/04149* (2013.01); *B01F 3/04* (2013.01); *B32B 5/06* (2013.01); *B32B 5/08* (2013.01); *B32B 5/24* (2013.01)

(58) Field of Classification Search
CPC .... B32B 5/00; B32B 5/06; B32B 5/08; B32B 5/24; B01F 3/04
USPC ......................... 428/304.4, 532, 537.1, 537.5
See application file for complete search history.

(56) References Cited

U.S. PATENT DOCUMENTS

| | | | | |
|---|---|---|---|---|
| 3,976,525 A | * | 8/1976 | Mednick | A47L 17/08 |
| | | | | 15/209.1 |
| 8,936,668 B2 | * | 1/2015 | Huizing | B01D 53/228 |
| | | | | 165/10 |

FOREIGN PATENT DOCUMENTS

| | | |
|---|---|---|
| DE | 69920256 T2 | 9/2005 |
| DE | 102009034095 A1 | 3/2010 |
| DE | 102013002561 A1 | 8/2014 |
| EP | 1261992 B1 | 5/2011 |
| WO | 9607783 A1 | 3/1996 |

\* cited by examiner

*Primary Examiner* — Robert A Hopkins

(57) ABSTRACT

Disclosed is a media suitable for use in a humidifier. The media is water vapor exchange media composed of two components. One component is a nonwoven web for water vapor exchange. A second component includes low melt polymeric fibers such as a polypropylene nonwoven web. The second component seals the first component, preventing exchange of gas through the media. The media is suitable for humidifier components, such as a humidifier component used in a fuel cell system.

14 Claims, 11 Drawing Sheets

MULTI-COMPONENT MEDIA FOR USE IN A HUMIDIFIER

CROSS REFERENCE TO RELATED APPLICATIONS

This application claims the benefit of prior filed U.S. provisional patent application No. 62/221,773, filed on Sep. 22, 2015, the entire contents of which are incorporated by reference.

TECHNICAL FIELD

The invention relates to a multi-component media for use in a humidifier, for example for a fuel cell.

BACKGROUND

In DE 10 2009 034 095 A1 and EP 1 261 992 B1, humidifiers for fuel cells are described which have a plurality of superimposed membranes which separate flow channels for the feed-through of moist and dry air. Water molecules penetrate the membranes from the moist to the dry air stream which is thus enriched with moisture. The exhaust gas of the fuel cell can be used as moist incoming air stream; the moisture of which exhaust gas is transferred through the membrane into a fresh-air stream which is then fed to the inlet of the fuel cell system in order to generate current in an electrochemical reaction.

SUMMARY

It is desirable to provide a humidifier having an economical design with which moisture is transferable in an efficient manner from a moist to a dry gas stream, wherein the gas streams are separated from one another.

Furthermore, it is desirable to provide a humidifier having that efficiently transfers moister to the dry gas stream while limiting the transfer of gas to the dry gas steam.

In one embodiment, a humidifier comprises a transfer sheet, a plurality of first channels, and a plurality of second channels. The transfer sheet comprises a permeable material having a plurality of sections and a plurality of layers of spacing materials. The plurality of first channels are configured to allow air flow in a first direction and to prevent airflow in a second direction that is different from the first direction. The plurality of second channels are configured to allow air flow in the second direction and to prevent airflow in the first direction. The humidifier comprises a stack of alternating first channels and second channels, and the first channels are configured to transfer liquid from air flowing in at least one of the first channels to air flowing in at least one of the second channels. A first channel is formed by folding a first section of the transfer sheet under a second section of the transfer sheet with a layer of spacing material provided therein. A second channel is formed by folding a third section of the transfer sheet over the second section of the transfer sheet with a layer of spacing material provided therein.

In one embodiment, a method of manufacturing a humidifier element comprises providing a transfer sheet comprising a permeable material having a plurality of sections. A first section of the transfer sheet is folded under a second section of the transfer sheet. A layer of spacing material is provided between the first section of the transfer sheet and the second section of the transfer sheet. An edge of the first section of transfer sheet is sealed to an edge of the second section of the transfer sheet to form a first channel configured to allow air flow in a first direction and to prevent airflow in a second direction that is different from the first direction. A third section of the transfer sheet is folded over the second section of the transfer sheet. A layer of spacing material is provided between the second section of the transfer sheet and the third section of the transfer sheet. An edge of the third section of the transfer sheet is sealed to an edge of the second section of the transfer sheet to form a second channel configured to allow air flow in the second direction and to prevent air flow in the first direction.

These and other features and objects of the invention will be more fully understood from the following detailed description of the embodiments, which should be read in light of the accompanying drawings.

In this regard, before explaining at least one embodiment of the invention in detail, it is to be understood that the invention is not limited in its application to the details of construction and to the arrangements of the components set forth in the description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be used as a basis for designing other structures, methods, and systems for carrying out the several purposes of the present invention. It is important, therefore, that the claims be regarded as including such equivalent constructions insofar as they do not depart from the spirit and scope of the present invention.

In a first embodiment the multi-component media for use in a humidifier comprises at least one layer of an absorbent material with a plurality of strands, wherein the absorbent material comprises a fibrous material that absorbs liquid. Further, the media has at least one layer of a non-absorbent material having a first side and a second side, wherein the at least one layer of the non-absorbent material comprises a material that is impervious to liquids and gases. The absorbent material is connected to the first side of the non-absorbent material so that at least one strand of the plurality of strands penetrates through the non-absorbent material to the second side of the non-absorbent material. The at least one strand of the plurality of strands transfers liquid material from the first side of the non-absorbent material to the second side of the non-absorbent material.

According to another embodiment the multi-component media the at least one layer of the non-absorbent material forms a barrier configured to prevent transfer of any material between the first side of the non-absorbent material and the second side of the non-absorbent material except for the liquid material that is transferred by the at least one strand.

Furthermore it is possible that moisture is transferred by the at least one strand via capillary action.

In yet another embodiment the absorbent material comprises a non-woven fibrous material.

According a preferred embodiment the absorbent material comprises at least one of a fibrillated cotton, a wood pulp, a naturally absorbent fibrous material, and an absorbent material blended with another fibrous material.

Beyond that yet another embodiment foresees that the multi-component media has at least two layers of the absorbent material, wherein the at least one layer of the non-absorbent material is disposed between a first layer of the absorbent material and a second layer of the absorbent material and the multi-component media is configured to transfer a from the first layer of the first material to the second layer of the first material.

In an alternative embodiment the multi-component media can comprise at least two layers of the non-absorbent material, wherein the at least one layer of the absorbent material is disposed between a first layer of the non-absorbent material and a second layer of the absorbent material, wherein the multi-component media is configured to transfer a liquid from a side of the first layer of the non-absorbent material to a side of the second layer of the non-absorbent material In another alternative embodiment the multi-component media further comprises at least two layers of the absorbent material and at least two layers of the non-absorbent material.

The non-absorbent material can comprise a polymer material.

For example the multi-component media according to the invention can be provided in a humidifier. The humidifier can be provided in at least one of a fuel cell system, a whole house humidifying system, an industrial humidifying system, and a room humidifying system.

Finally it is possible that the at least one layer of the non-absorbent material prevents particles from passing through the multi-component media.

BRIEF DESCRIPTION OF THE DRAWINGS

The drawings described herein are for illustrative purposes only of selected embodiments and not all possible implementations, and are not intended to limit the scope of the present disclosure.

In the drawings:

FIG. 4*a* is a perspective view a first embodiment for sealing two edges of folded media having a spacing material there between;

FIG. 4*b* is another perspective view a first embodiment for sealing two edges of folded media having a spacing material there between;

FIG. 4*c* is another perspective view a first embodiment for sealing two edges of folded media having a spacing material there between;

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
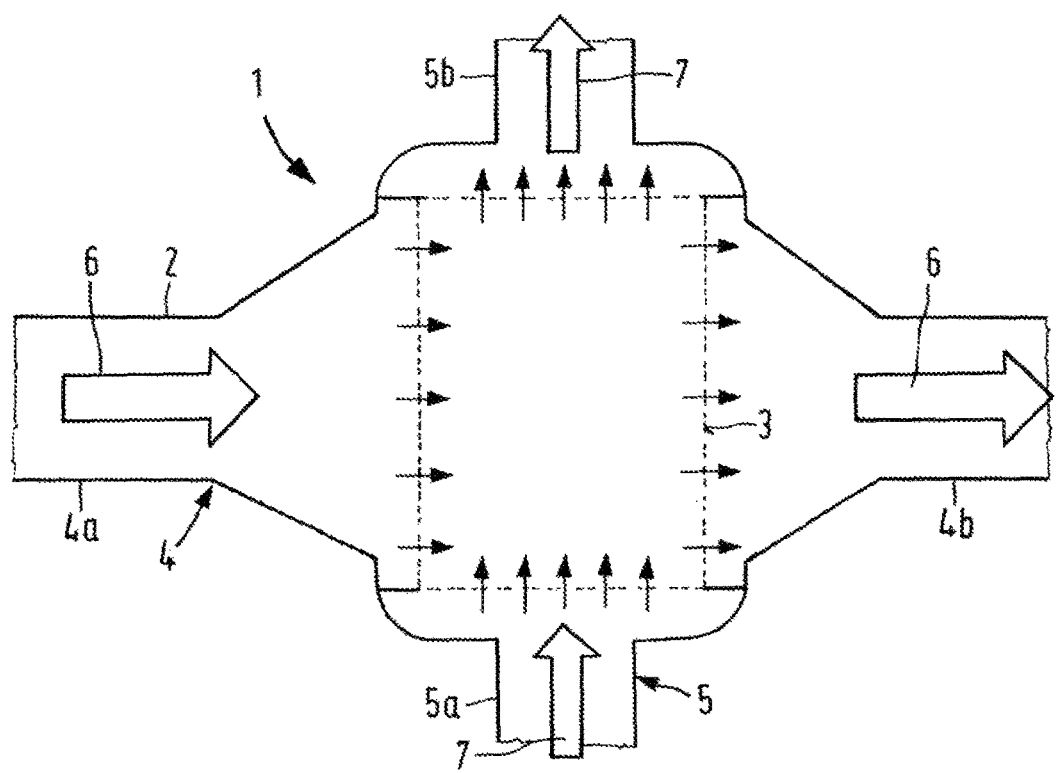
FIG. 1 is a perspective view of a humidifier.

FIG. 1 illustrates a humidifier 1 for a fuel cell, by means of which fresh air enriched with moisture is fed to the fuel cell, said fresh air having a minimum level of humidity. In a housing 2, the humidifier 1 has a cartridge 3 for transferring the moisture contained in an exhaust gas stream 7 to a dry fresh-air stream 6 which is fed to the fuel cell. The cartridge 3 has a stacking unit with a majority of water-permeable fabric layers stacked one above the other, each separating air streams 6, 7 of different moisture content. The fabric layers separate the air streams from one another and simultaneously allow for a moisture exchange between the air streams 6, 7, and so the dry fresh-air stream 6 absorbs moisture from the moist exhaust gas stream 7.

The housing 2 of the humidifier 1 is provided with a fresh-air channel 4, by means of which ambient air is introduced as fresh-air stream 6. The fresh-air channel 4 comprises a feed section 4*a* upstream of the cartridge 3 and an outflow section 4*b* downstream of the cartridge.

The housing 2 is provided with an exhaust gas channel 5 which is offset by an angle of 90 degrees relative to the fresh-air channel 4, and by means of which channel exhaust gases of the fuel cell enriched with moisture are guided through the cartridge as exhaust gas stream 7. The exhaust gas channel 5 has a feed section 5*a* upstream of the cartridge 3 and an outflow section 5*b* downstream of the cartridge.

The fresh-air stream 6 and the exhaust gas stream 7 intersect according to the alignment of the channels 4 and 5 at an angle of 90 degrees; however, the air streams 6 and 7 within the cartridge 3 are separated by the water-permeable fiber layers which only allow a water exchange from the exhaust gas stream with high moisture content 7 to the dry fresh-air stream 6.

The two gas streams can be arranged at angles other than the substantially 90 degrees shown in the drawing, e.g. as an arrangement in the counter flow with an angle between the two gas streams of substantially 180 degrees, or other advantageous designs.

Figure 2:
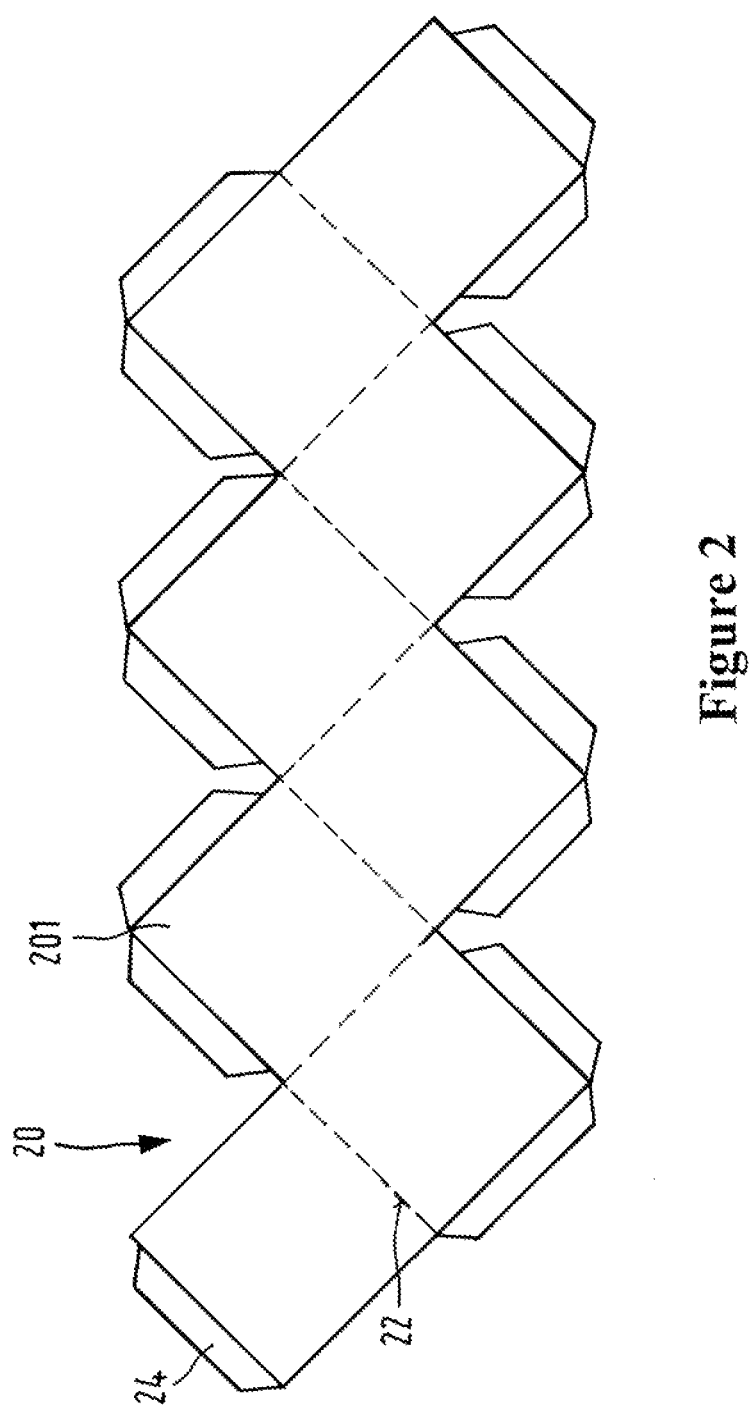
FIG. 2 is a perspective view a media comprising a permeable membrane.

FIG. 2 illustrates a media 20 used in the cartridge 3 of the housing 2 (see FIG. 1). The media 20 comprises a permeable membrane. Cutting the membrane into a specific shape prior to assembly creates the ability to properly fold the cell humidifier core to create alternating flow channels. The sections are folded along fold lines 22 (indicated by dotted lines in the figure), a spacing material 30 is provided between each section, and flaps 24 are utilized to form edges. This is further illustrated in FIG. 3. The alternating flow channels are alternating channels of wet air and dry air in adjacent flow paths to one another. This allows for moisture to be transferred from the wet air to the dry air.

Figure 3:
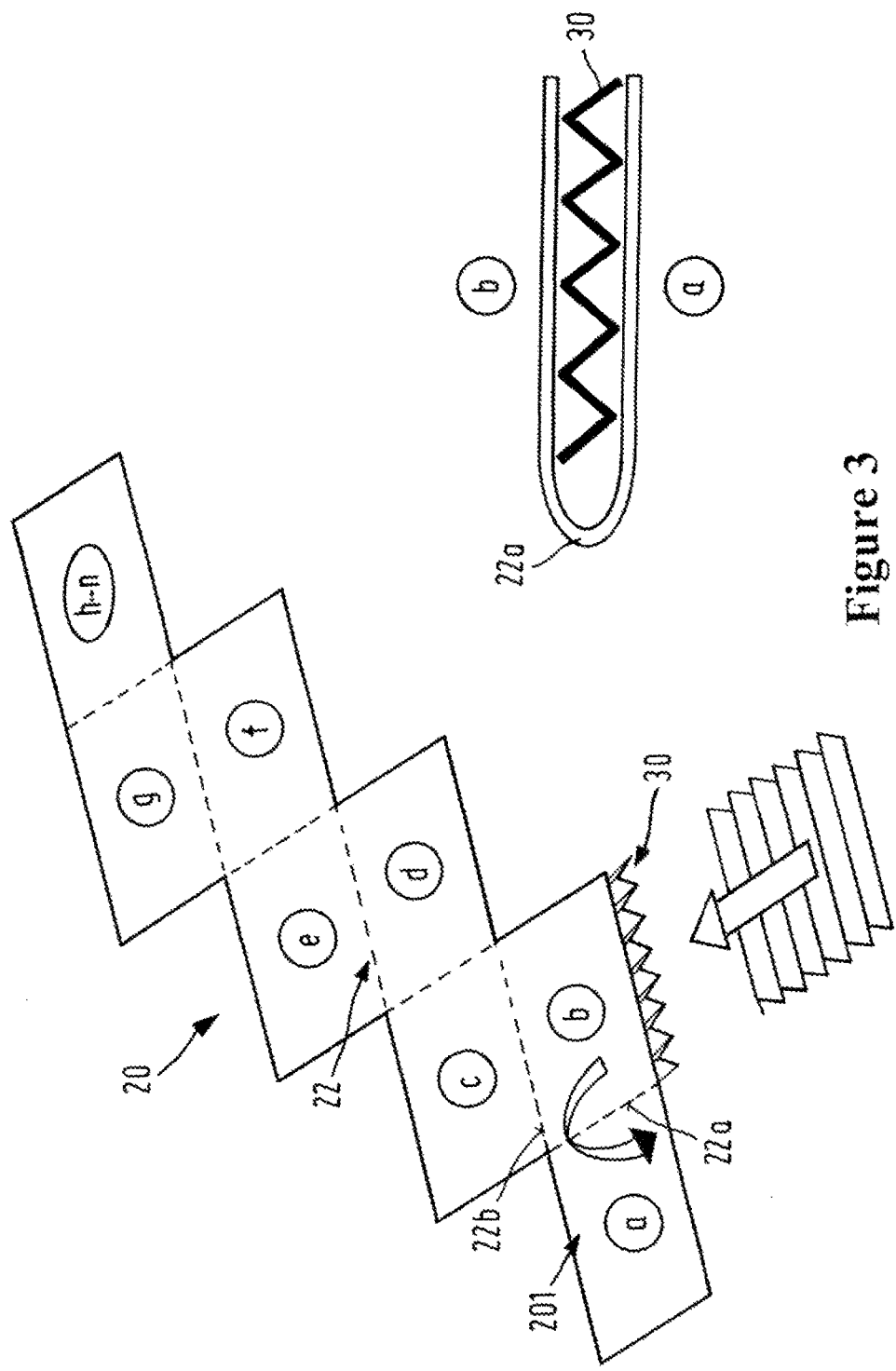
FIG. 3 is a perspective view of the media and a spacing material.

FIG. 3 illustrates a fuel cell humidifier core using the media 20, comprising a permeable membrane 201, and a pleated spun bond plastic spacing material 30 to create a humidifier core element through a series of folds and edge sealing processes. Section 1 of the media 20 is folded along the folding line 22*a* under section 2 of the media and a layer of spacing material 30 is provided between section a and section b. Section c is folded along folding line 22b above section 2, and another layer of spacing material is provided between section b and section c. This process is repeated for all sections (d through n) until a humidifier core of a desired size is formed. This is further shown in FIG. 5.

The permeable membrane 201 of media 20 seals once it is saturated with liquid, allowing the transfer of liquid from the wet channel to the dry channel without allowing for the transfer of gas from between the wet and dry and channel. The spacing material 30 may be any material that is suitable for creating the desired spacing between the layers without disrupting the flow of air in the channel. For example, the spacing material may be a plastic material or an elastomer.

Figure 4A:
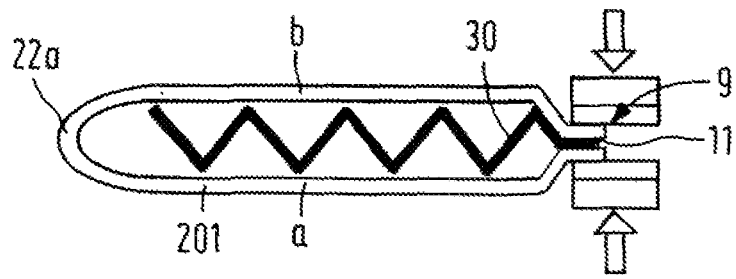
Figure 4B:
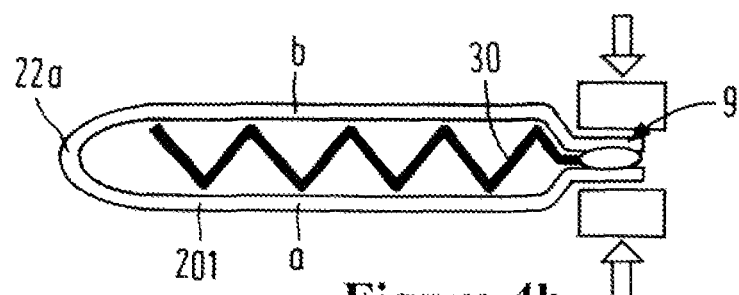
Figure 4C:
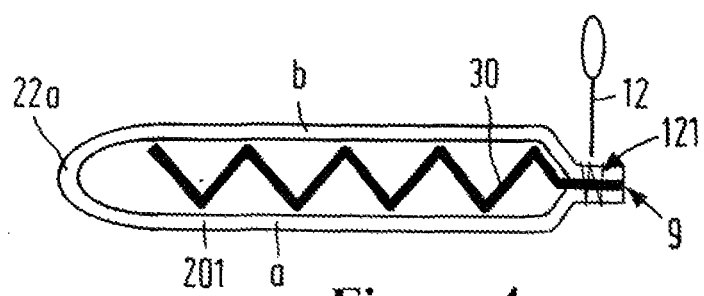

FIGS. 4a-4c illustrate various methods for sealing edges of the channels. In FIG. 4a, a heat and pressure are applied to an open end of the fold capturing both sides of the permeable membrane 201 and a portion of the spacing material 30. The heat and pressure cause the spacing material to bond to both sides of the permeable membrane forming a sealed edge 9.

In FIG. 4b, a bead of a sealing material 11, such as glue or epoxy, is applied to an open edge of the fold prior to folding the membrane 201. The membrane 201 is folded over and pressure is applied to both sides of the membrane. When the sealing material sets or dries, a sealed edge is formed.

In FIG. 4c, a sealed edge 9 is formed by a sewing process. A needle 12 and thread 121 are utilized to seal both sides of the membrane while securing a portion of the spacing material 30 to the membrane 201.

Although three methods of forming a sealed edge 9 are shown, any suitable method of sealing the edge may be utilized. For example, the edge could by sealed by using other known fastening techniques such as stapling or applying a hot melt adhesive.

Figure 5:
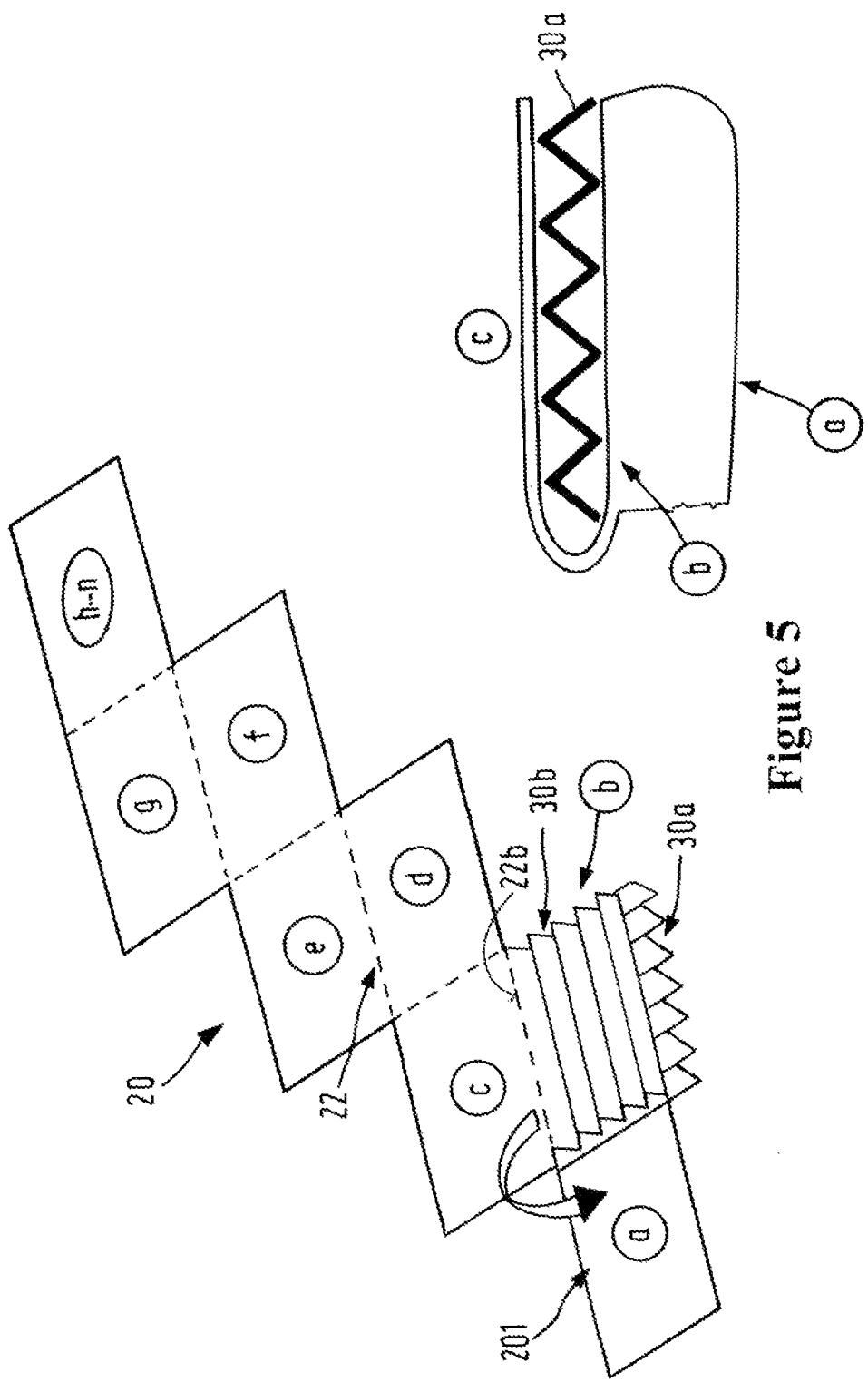
FIG. 5 is a perspective view illustrating how the media is folded and spacing material is provided to form a humidifier core.

FIG. 5 illustrates a method of manufacturing a humidifier core 8. The method includes providing the media 20 as a transfer sheet comprising the permeable material having a plurality of sections. A first section a of the transfer sheet is folded under a second section b of the transfer sheet. A layer of spacing material 30a is provided between the first section a of the transfer sheet and the second section b of the transfer sheet. An edge of the first section a of transfer sheet is sealed to an edge of the second section b of the transfer sheet to form a first channel configured to allow air flow in a first direction and to prevent airflow in a second direction that is different from the first direction. A third section c of the transfer sheet is folded over the second section b of the transfer sheet. Another layer of spacing material 30b is provided between the second section of the transfer sheet and the third section of the transfer sheet. An edge of the third section of the transfer sheet is sealed to an edge of the second section of the transfer sheet to form a second channel configured to allow air flow in the second direction and to prevent air flow in the first direction. This process is repeated for the remaining sections of the permeable transfer sheet forming a humidifier element. When the spacing material is a pleated sheet, the alternating layers 30a and 30b are provided with the pleats running in a direction that is substantially perpendicular to the direction of the pleats in the adjacent layer.

An advantage of this method is that the permeable transfer medium can be provided in different sizes resulting in humidifier element having different dimensions. The number of sections is selected to obtain the desired number of channels. The more channels, the higher the transfer rates of fluid from the wet air flow to the dry air flow.

Figure 6:
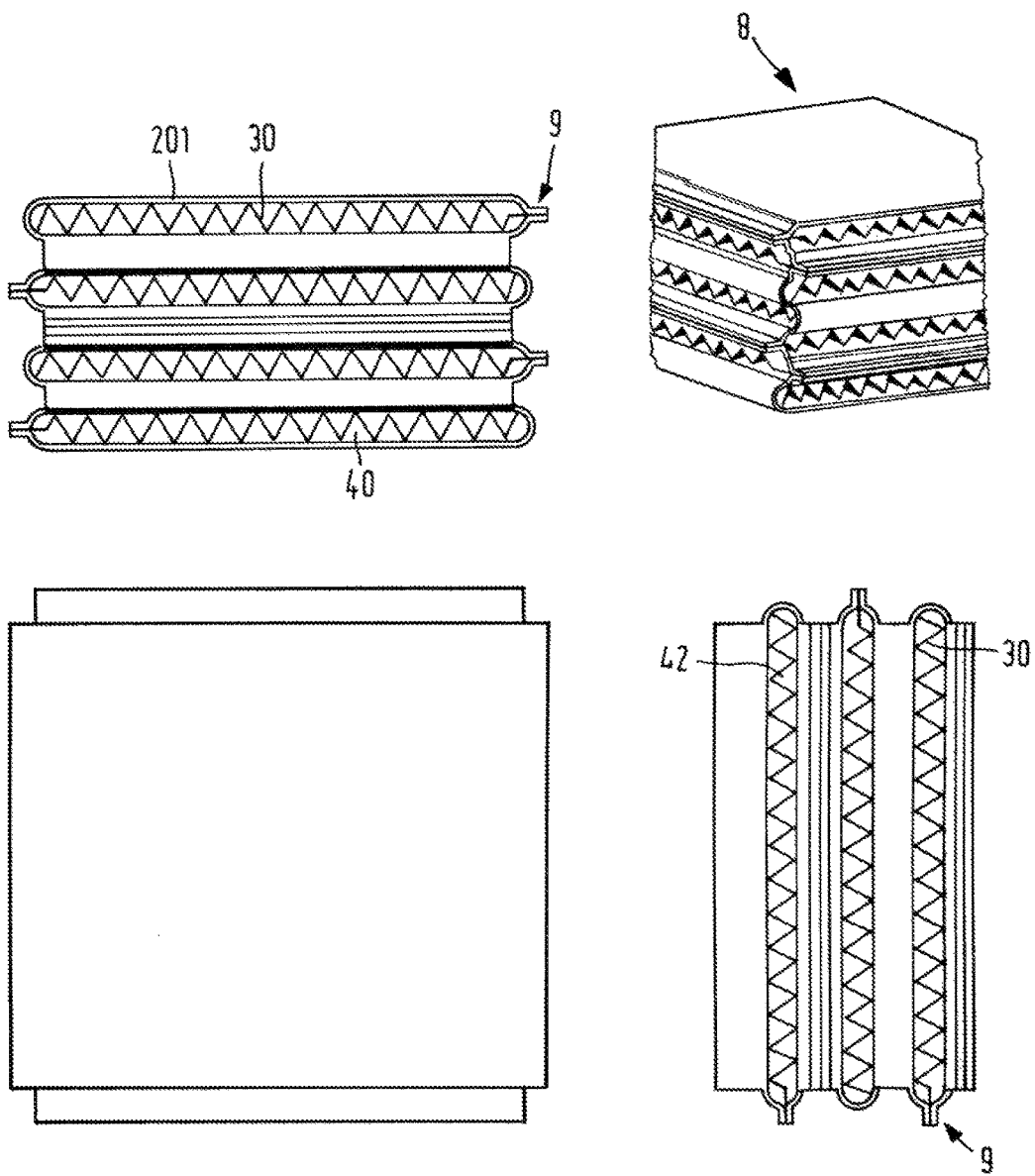
FIG. 6 is a perspective of a humidifier core.

FIG. 6 illustrates various view of a completed humidifier core 8. The humidifier core 8 comprises alternating channels 40,42 having sealed edges 9 in a first direction or a second direction. The sealed edges 9 prevent flow of gas in a particular direction. This enables odd channels 40 to allow gas flow in one direction and even channels 42 to allow gas flow in second direction that is perpendicular to the first direction. Accordingly the odd channels allow only dry air flow and the even channels allow wet air flow. Alternatively, the odd channels allow only wet air flow and the even channels allow only dry air flow. This feature is illustrated in FIG. 7.

Figure 7:
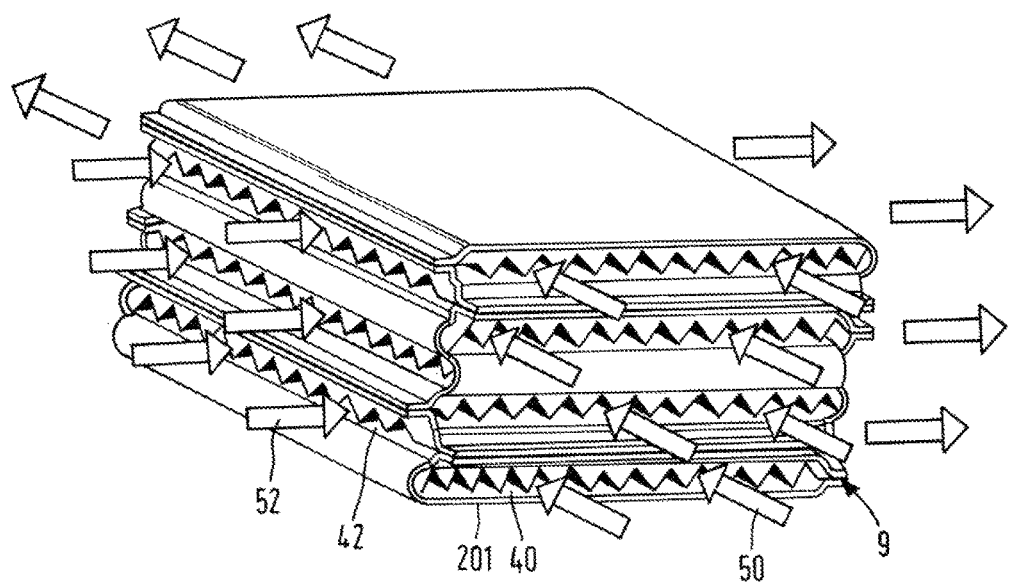
FIG. 7 is a perspective view of a humidifier core showing wet and dry airflow.

FIG. 7 shows that the odd channels 40 allow air to flow in a first direction indicated by arrows 50 while the even channels 42 allow air to flow in a second direction indicated by arrows 52. The first direction is substantially perpendicular to the second direction. If the air flow in the first direction is "wet" air and the air flow in the second direction is "dry" air, the transfer sheet transfers moisture from the wet air to the dry air.

The transfer sheet may comprise any material that allows for the transfer of fluid or fluid vapors, while preventing the transfer of gas or air. Some suitable media and method of manufacturing the media are described below.

In one embodiment, the transfer sheet comprises a water vapor exchange media composed of two components. A first component is nonwoven web for water vapor exchange. For example, this material may be a fibrillated cellulosic material, an all-natural material such as bamboo, or wood pulp, or a natural absorbent fiber. A second component comprises a low melt polymeric fiber such as polypropylene nonwoven web. The second component can be any suitable material that has a melting point lower than the melting point of the first component. The second component seals the first component preventing the exchange of gas or air through the media.

Figure 8:
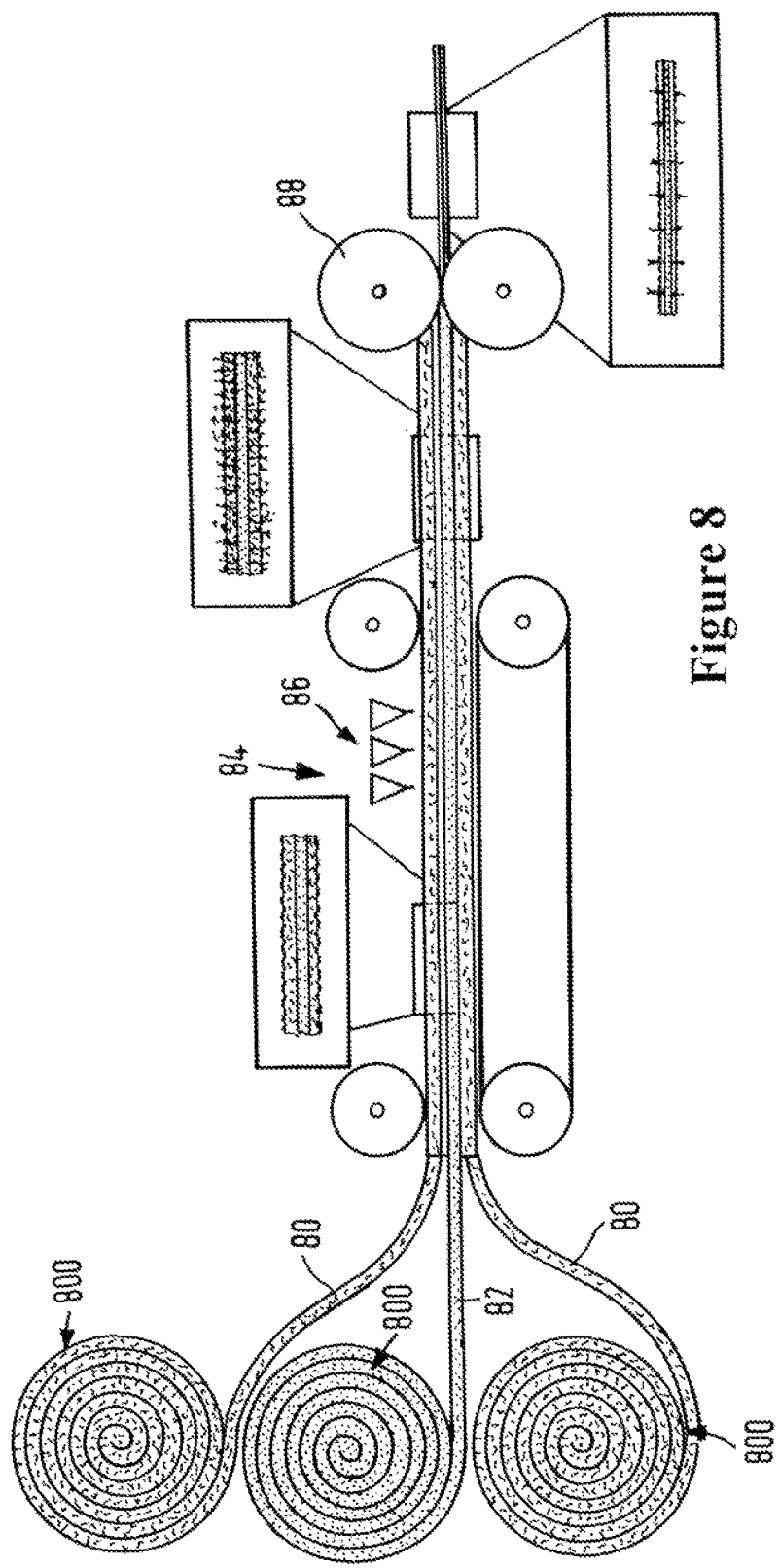
FIG. 8 illustrates on embodiment for forming the media comprising a permeable membrane.

FIG. 8 illustrates a method manufacturing a two component transfer sheet. Two roles 800 of the second media 80 are provided with one roll 800 of the first media 82 provided there between. The three layers of media 80,82 are passed through an entangling machine 84 that entangles fibers. A hydroentangling machine that entangles the fibers using high pressure water jets 86 is shown. Other entangling machines, such as machines that use needles or high pressured gas jets, may also be utilized. The entangling causes fibers of the second material to be brought to both a bottom surface of the bottom role 800 of the second media 80 and a top layer of the top roll 800 of the second media 80. The entangled media is passed through heaters 88, such as hot rollers, that heat the entangled media causing the two layers of the second media 80 to melt and seal around the fibers of the first media 82. When the finished media comes into contact with a liquid or wet gas, the fibers of the first media expand and act like straws, allowing transfer of liquid between the finished media through the "straws" while preventing the transfer of gas through media.

Figure 9:
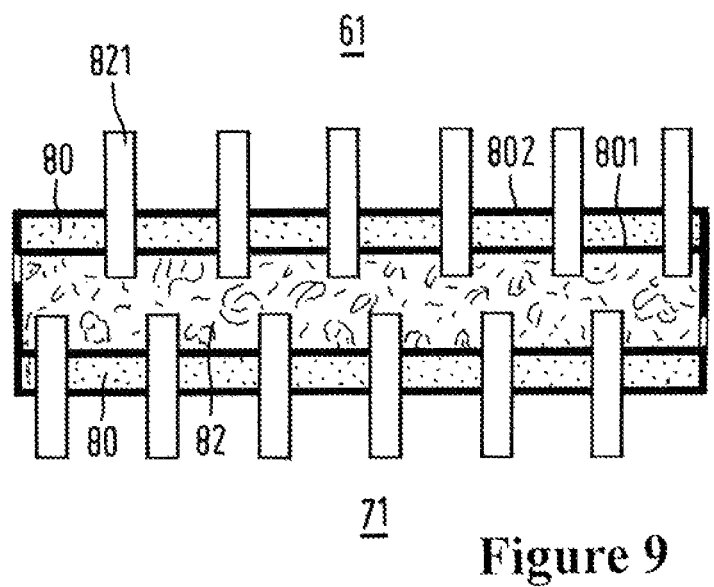
FIG. 9 is an exploded view of one embodiment of the media.

This action is illustrated in FIG. 9. A finished media has a dry side 61 and wet side 71. The "straws" resp. strands 821 of the first media 82 transfer fluid from the wet side 71 to the dry side 61 via capillary action. The second media 80 seals the first media 82, preventing the transfer of air or other gasses from the wet side 71 to the dry side 61 of the finished media.

Figure 10:
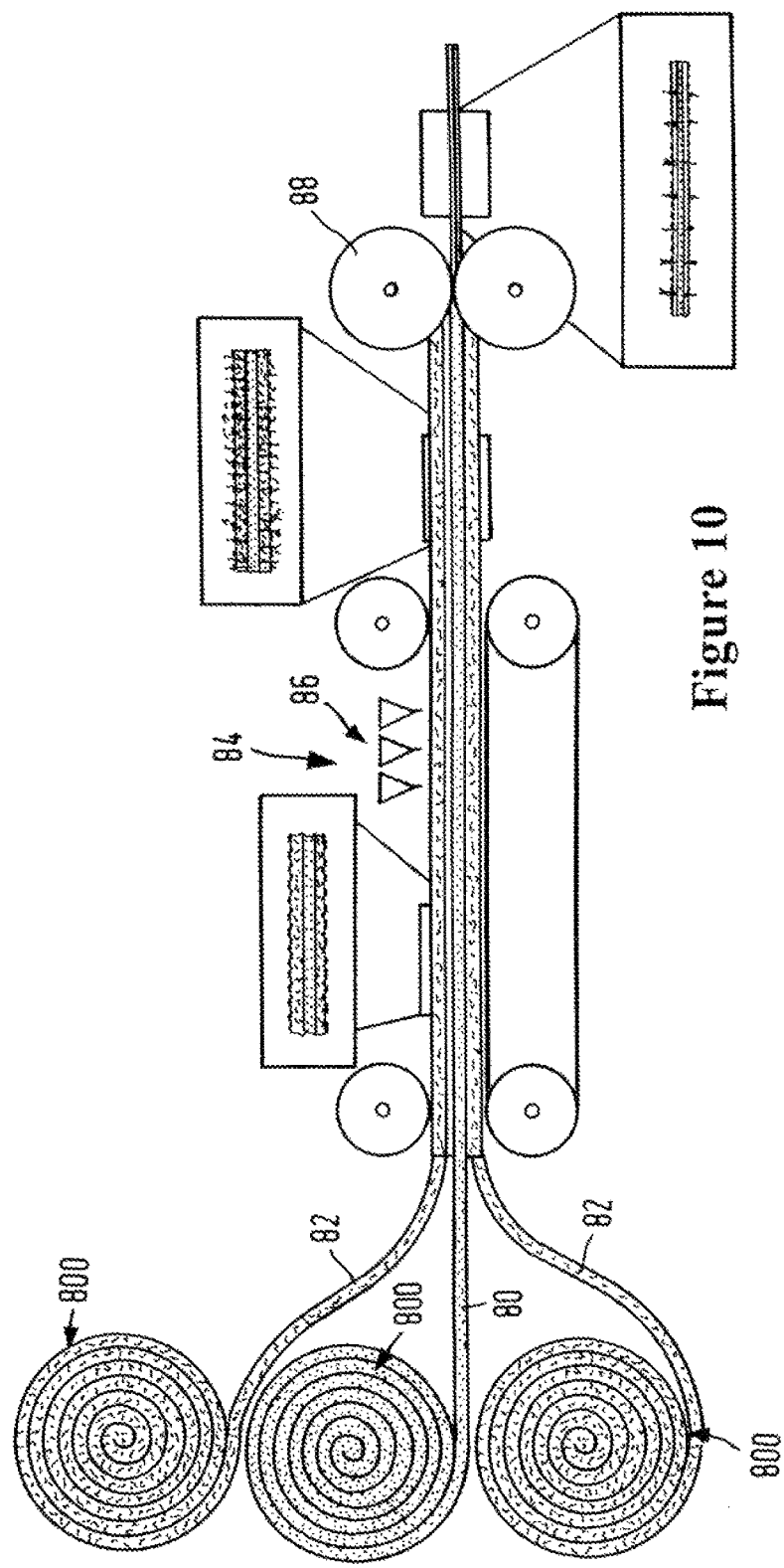
FIG. 10 illustrates another embodiment for forming the media comprising a permeable membrane.

FIG. 10 illustrates another embodiment in which two rolls 800 of the first media 82 are provided with one roll 800 of the second media 80 provided there between. In this embodiment, when the rolls 800 of material pass through the entangling machine 84, the two layers of the first media 82 get connected from side of the second media 80 to another side of the second media. The entangled media is passed through heaters 88, such as hot rollers, that heat the entangled media causing the layer of the second media to melt and seal around the fibers of the first media. When the finished media comes into contact with a liquid or wet gas, the fibers of the first media expand and act like straws, allowing transfer of liquid between the finished media through the "straws" while preventing the transfer of gas through media.

Figure 11:
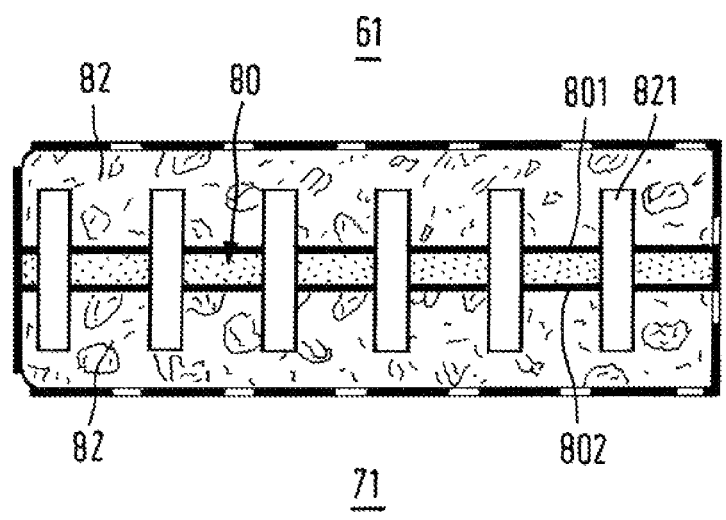
FIG. 11 is an exploded view of another embodiment of the media.

This action is illustrated in FIG. 11. The finished media has a dry side 61 and a wet side 71. The first media 82 on the wet 71 side absorbs liquid, such as water, and transfers liquid to the dry side 61 through the "straws" resp. strands 821 via capillary action. The second media 80 seals around the "straws" 821 preventing the transfer of air or other gases through the finished media.

Although the humidifier has been described as being provided in a fuel cell system, the humidifier described herein may be used in any desired humidifier system. For example, the humidifier is suitable for a whole house humidifying system, an industrial humidifying system, and a room humidifying system.

The many features and advantages of the invention are apparent from the detailed specification. Thus, the appended claims are intended to cover all such features and advantages of the invention which fall within the true spirits and scope of the invention. Further, since numerous modifications and variations will readily occur to those skilled in the art, it is not desired to limit the invention to the exact construction and operation illustrated and described. Accordingly, all appropriate modifications and equivalents may be included within the scope of the invention.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

The invention claimed is:

1. A multi-component media (20) for use in a humidifier (1), comprising:
   at least one layer of an absorbent material (82) having a plurality of strands (821), wherein the absorbent material (82) comprises a fibrous material that absorbs liquid; and
   at least one layer of a non-absorbent material (80) having a first side (801) and a second side (802), wherein the at least one layer of the non-absorbent material (80) comprises a material that is impervious to liquids and gases;
   wherein the absorbent material (82) is connected to the first side of the non-absorbent material (80) so that at least one strand (821) of the plurality of strands (821) penetrates through the non-absorbent material (80) to the second side of the non-absorbent material;
   wherein the at least one strand (821) of the plurality of strands (821) transfers liquid material from the first side (801) of the non-absorbent material (80) to the second side (802) of the non-absorbent material (80).

2. The multi-component media (20) according to claim 1, wherein the at least one layer of the non-absorbent material (80) forms a barrier configured to prevent transfer of any material between the first side of the non-absorbent material (80) and the second side (802) of the non-absorbent material (80) except for the liquid material that is transferred by the at least one strand.

3. The multi-component media (20) according to claim 2, wherein moisture is transferred by the at least one strand (821) via capillary action.

4. The multi-component media (20) according to claim 1, wherein the absorbent material (82) comprises a non-woven fibrous material.

5. The multi-component media (20) according to claim 4, wherein the absorbent material (82) comprises at least one of a fibrillated cotton, a wood pulp, a naturally absorbent fibrous material, and an absorbent material blended with another fibrous material.

6. The multi-component media (20) according to claim 1, further comprising at least two layers of the absorbent material (82).

7. The multi-component media (20) according to claim 6, wherein the at least one layer of the non-absorbent material (80) is disposed between a first layer of the absorbent material (82) and a second layer of the absorbent material (82) and the multi-component media (20) is configured to transfer a from the first layer of the first material to the second layer of the first material.

8. The multi-component media (20) according to claim 1, further comprising at least two layers of the non-absorbent material (80).

9. The multi-component media (20) according to claim 8, wherein the at least one layer of the absorbent material (82) is disposed between a first layer of the non-absorbent material (80) and a second layer of the absorbent material (82), wherein the multi-component media (20) is configured to transfer a liquid from a side of the first layer of the non-absorbent material (80) to a side of the second layer of the non-absorbent material (80).

10. The multi-component media (20) according to claim 1, further comprising:
   at least two layers of the absorbent material (82); and
   at least two layers of the non-absorbent material (80).

11. The multi-component media (20) according to claim 1, wherein the non-absorbent material (80) comprises a polymer material.

12. The multi-component media (20) according to claim 1 wherein the multi-component media (20) is provided in a humidifier (1).

13. The multi-component media (20) according to claim 12, wherein the humidifier (1) is provided in at least one of a fuel cell system, a whole house humidifying system, an industrial humidifying system, and a room humidifying system.

14. The multi-component media (20) according to claim 12, wherein the at least one layer of the non-absorbent material (80) prevents particles from passing through the multi-component media (20).

* * * * *